United States Patent [19]

Urech

[11] Patent Number: 5,343,010
[45] Date of Patent: Aug. 30, 1994

[54] PROCESS FOR SEAM WELDING OF SHEET METAL BLANKS

[75] Inventor: Werner Urech, Kaiserstuhl, Switzerland

[73] Assignee: Elpatronic AG, Zug, Switzerland

[21] Appl. No.: 861,571

[22] Filed: Apr. 1, 1992

[30] Foreign Application Priority Data

Apr. 9, 1991 [CH] Switzerland ............... 01045/91-8

[51] Int. Cl.$^5$ ............................................ B23K 11/06
[52] U.S. Cl. .................................. 219/83; 219/105; 228/170
[58] Field of Search ................ 219/117.1, 105, 83, 219/84, 81, 82; 228/170, 171, 172, 173.6, 160

[56] References Cited

U.S. PATENT DOCUMENTS

| | | | |
|---|---|---|---|
| 2,055,360 | 9/1936 | Ogden | 228/172 |
| 3,313,911 | 4/1967 | Seeloff | 219/117.1 |
| 3,909,579 | 9/1975 | Williams et al. | 219/83 |
| 5,037,024 | 8/1991 | Minato et al. | 228/160 |

FOREIGN PATENT DOCUMENTS

| | | |
|---|---|---|
| 661009 | 6/1938 | Fed. Rep. of Germany . |
| 8326994 | 6/1987 | Fed. Rep. of Germany . |
| 2195497 | 3/1974 | France . |
| 58-53383 | 3/1983 | Japan . |
| 60-6273 | 1/1985 | Japan . |
| 61-176490 | 8/1986 | Japan . |
| 3-60873 | 3/1991 | Japan . |
| 3-60874 | 3/1991 | Japan ............... 219/83 |
| 6410540 | 3/1966 | Netherlands . |

OTHER PUBLICATIONS

*Metals Handbook*, 8th ed., vol. 6, pp. 415, 416, 425, 433, Mar. 1974.
Welding and Metal Fabrication 37/2. Feb. 1969 by J. E. Hubb, Haywards Heath, Great Britain, pp. 64–65.

*Primary Examiner*—Geoffrey S. Evans
*Attorney, Agent, or Firm*—McCormick, Paulding & Huber

[57] ABSTRACT

As preparation for the seam welding of different thickness sheet metal blanks (10 and 12), at least the thicker (10) of the two blanks is reduced in thickness, preferably by chip machining, in its edge region (11) which is intended for welding. Since the edge regions (11 and 13) which are to be welded then approximate to each other in their thicknesses (t1+t2), practically symmetrical conditions with regard to the joint plane exist for the welding operation, so that the welding can proceed with substantially the same controllable welding parameters as in the seam welding of sheet metal blanks of equal thickness. The process is suitable mainly for use in mash seam welding, but also in other seam welding processes, such as for example, in laser welding.

5 Claims, 1 Drawing Sheet

PROCESS FOR SEAM WELDING OF SHEET METAL BLANKS

BACKGROUND OF THE INVENTION

The invention relates to a process for the seam welding of sheet metal blanks of unequal thickness. In so-called sheet metal welding, in particular, in which two or more sheet metal blanks or panels are joined together into larger panel configurations, it is necessary to an increasing extent also to weld together sheet metals of varying thickness and surface quality. The welding processes used—mash seam welding and laser welding—encounter specific difficulties, however, in this connection.

With mash seam welding (a particular form of electric resistance roll seam welding between two electrode rollers), the zone with the highest temperature is more or less symmetrically set between the contact surfaces of the electrodes; in the case of sheet metals of sharply varying thickness, this zone consequently occurs mainly within the cross-section of the thicker metal sheet, and therefore is offset in relation to the jointing plane between the metal sheet edges which overlap each other. In order to obtain nevertheless a reliable welding of both edges, increased electrical power is necessary, and welding can occur only at considerably reduced speed (compared with the welding of metal sheets of equal thickness). The asymmetrical position of the zone with the highest temperature may also have the result that more or less deep and inadequately welded gaps remain, running from the edges of the metal sheets, which are undesirable with regard to corrosion and mechanical strength (fluctuating loading and workability). Finally, the thickening and/or the thickness transition along the mash seam are relatively large, which once again can cause problems, e.g. during subsequent deep-drawing of the welded workpieces.

An "asymmetry" of a different kind occurs during laser welding with metal sheet edges butted together. Whilst with metal sheets of equal thickness the laser beam is exactly perpendicular to the metal sheet plane and aligned with the butt joint, it has to be set slightly obliquely to a joint, with unequally "high" edges. However, the depth effect of the beam in the joint (parallel to the edge abutment) is drastically reduced thereby, and the fusing of the two metal sheet edges occurs with considerable asymmetry. Even with the laser process, sheet metal blanks of different thicknesses can for this reason only be welded at a considerably reduced rate of feed and with the risk of reduced seam quality.

The difficulties mentioned, which occur in the seam welding of sheet metal blanks of unequal thickness without additional material, are intended to be overcome with the invention. In particular, the rate of feed is intended to approximate to that in the seam welding of metal sheets of equal thickness, and the quality of the welding seam is intended to be better controlled, i.e. to be more reliably produced.

SUMMARY OF THE INVENTION

This problem is solved with the process according to the invention, in that as preparation for the welding operation, at least the thicker of the two sheet metal blanks is prepared so as to be of reduced thickness in its edge region which is being welded. By this means are provided, on the one hand, in the area of the welding seam, symmetrical conditions similar to those in the welding of metal sheets of equal thickness, which permits machine operation within a wider non-critical parameter range. Moreover, considerable further advantages (partly also applying to laser welding) are obtained particularly in the case of mash seam welding: the thickening in the seam area is relatively small, the one side of the workpiece remaining practically level (which has rarely been obtained up to now). With regard to the workpiece properties (mechanical strength with fluctuating loads, workability, corrosion properties of the joint), it is advantageous that the thickness transition no longer coincides with the welding seam, but is placed in the uniform area of the thicker metal sheet. Furthermore, an oxide layer, rolling skin, metal coating (e.g. zinc) which may be present, or a non-metallic coating, is simultaneously removed with the preparatory treatment (at least on the one metal sheet), and a clean surface therefore obtained for the welding.

The seam welding of sheet metal blanks of unequal thickness can, in general, be considerably better controlled than heretofore and the welding speed increased with the process according to the invention. New possibilities are thereby opened up particularly for sheet metal welding or the structural design and use of welded sheet metal blanks.

A special further development of the process according to the invention relates to workpieces which are connected by mash seam welding.

BRIEF DESCRIPTION OF THE DRAWINGS

Exemplified embodiments of the invention are explained in greater detail hereafter in conjunction with the drawings.

DESCRIPTION OF THE PREFERRED EMBODIMENTS

Figure 1A:
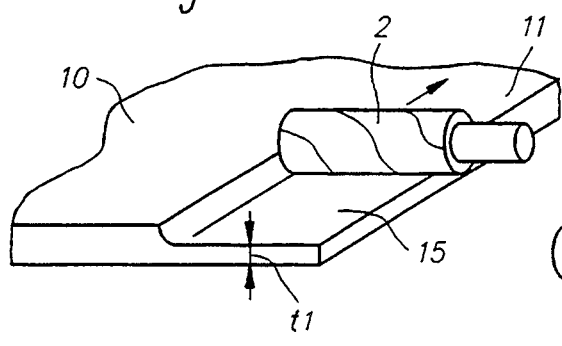
FIGS. 1a and 1b show diagrammatically the edge regions of two sheet metal blanks of unequal thickness during preparation for the welding operation.
Figure 1B:
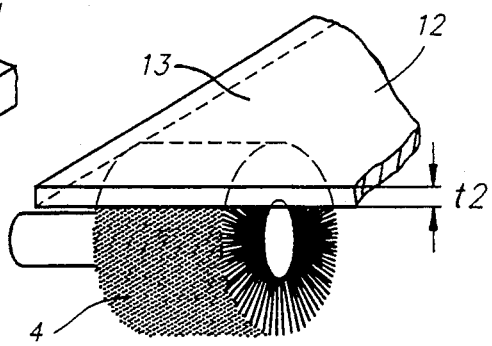

In FIG. 1a is illustrated a part of a thicker sheet metal blank 10 and in FIG. 1b a part of a thinner sheet metal blank 12. The edge regions 11 or 13 of these sheet metal blanks are intended to be connected together by seam welding. According to FIG. 1a, the edge region 11 of the thicker blank 10 is machined, in order to reduce its thickness in preparation for the welding operation. As illustrated, material in the edge region is appropriately reduced in thickness, so that a lap or margin with a prepared, clean surface 15 is produced, whose thickness t1 corresponds roughly to the thickness t2 of the thinner sheet metal blank 12. The material can be removed, for example, by means of a cutter 2 which is moved in the longitudinal direction of the edge, but also by grinding, planing, descaling etc. In the example according to FIG. 1a, the preparation occurs in such a way that the margin which is produced is of equal thickness all over and the prepared surface 15 runs parallel to the facing outer surface of the metal sheet.

It may be advantageous, as per FIG. 1b, to treat the edge region 13 of the thinner sheet metal blank 12 on the surface, e.g. in manner known per se by means of a rotating brush 4. Here, it is a matter of preparation without any noticeable reduction of thickness, merely to ensure a good metallic contact during the mash seam welding; the edge region 13 which is to be welded overlapping is prepared in the contact area of the electrode rolls, at least on the side of the joint plane (here the underside), and if necessary, also on the opposite side. Here, it may merely be a question of a mechanical surface cleaning, e.g. descaling, or of the removal of a metal coating or a non-metallic layer. On the thicker blank 10 also, a per se known surface preparation on the opposite side to the thickness reduction (underside in FIG. 1a) can be considered with a view to good electrode contact or in order to avoid electrode contamination. It is likewise even conceivable to carry out the thickness-reducing preparation on both sides on the thicker blank 10, i.e. to "distribute" the material removal to both sides.

Figure 2:
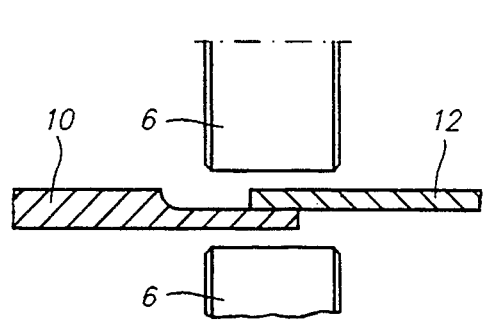
FIG. 2 illustrates diagrammatically the situation before the mash (roll seam) welding.

FIG. 2 shows the sheet metal blanks 10 and 12 prepared in accordance with FIG. 1 positioned between two electrode rolls 6 for the mash seam welding. The edge region 13 of the thinner blank 12 overlaps the edge region of the blank 10 which is reduced in thickness, advantageously on the prepared or cleaned side. Starting from this positioning, the mash seam welding takes place in per se known manner by pressing of the electrode rolls 6 against each other and longitudinal feed of the blanks 19 and 12 in the direction of their edges.

Figure 3:
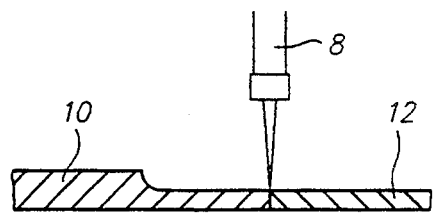
FIG. 3 shows it during seam welding by means of lasers.

As illustrated diagrammatically in FIG. 3, the blanks 10 and 12 of different thicknesses prepared in accordance with FIG. 1 can also be held with their longitudinal edges butted against each other, in order to be welded along the joint face in manner known per se by means of lasers 8. On account of the absence of overlap, the width of the prepared edge region of the thicker blank can generally be kept slightly smaller than in the mash seam welding method according to FIG. 2. Thanks to equal or almost equal thickness of the blank 12 and the abutting edge region of the blank 10, symmetrical conditions exist along the joint face, and the laser beam can be set exactly perpendicular to the metal sheet surface and flush with the joint face.

Figure 4:
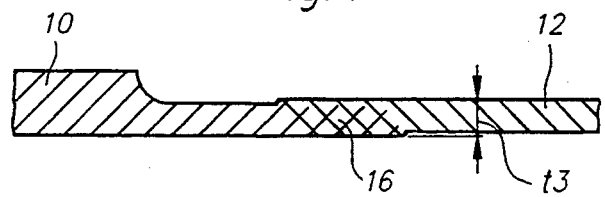
FIG. 4 shows on a slightly larger scale a cross-section through the mash seam produced with the arrangement according to FIG. 2, and FIGS. 5 and 6 show examples of thickness-reducing edge preparation on both sheet metal blanks in preparation for the mash seam welding.

A mash seam 16 produced with the arrangement according to FIG. 2 is illustrated diagrammatically in cross-section in FIG. 4. Thanks to the aforedescribed preparation for matching the thickness of the edge regions to be welded, during welding of the different thickness blanks 10 and 12 there exist practically equally favourable conditions as in the seam welding of blanks of equal or almost equal thickness. In the welding area 16 a well controllable, practically symmetrical welding zone is formed, and the operation can proceed with substantially the same high rate of feed and the same further welding parameters (welding current, electrode pressure, overlap width etc. ) as in the mash seam welding of sheet metal blanks of equal thickness. For the functional properties of the welded product (sheet metal blank) it is particularly important that the thickness t3 of the mash seam 16 remains relatively small. It is readily possible to obtain mash seams of a maximum of 1.4 times the thickness (or even considerably less), based on the mean thickness $(t1+t2)/2$ of the welded edge regions. This results in the one side of the welded sheet metal blank being practically level (underside in FIG. 4 ). Such sheet metal blanks can also be deep-drawn or plastically worked in another way without special difficulties in the area of the welding seam.

Figure 5:
Figure 6:
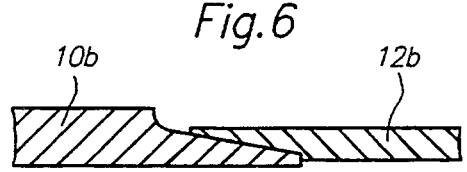

FIGS. 5 and 6 show examples of contour cross-sections of metal sheets 10a, 12a or 10b, 12b having different thicknesses, on which both edge regions being welded have been prepared to reduce the thickness (illustration in overlapped position, but before welding). Common to both examples is the fact that the edge regions of both sheet metal blanks are prepared by making a cut inclined at the same angle to the plane of the metal sheet. This type of preparation can be particularly advantageous if the thinner blank 12a or 12b has a rolling skin or for example, a metallic coat or a non-metallic layering which impedes welding.

I claim:

1. A method of seam welding sheet metal blanks of unequal thickness, characterized in that, as preparation for the welding operation, at least the thicker of two sheet metal blanks is treated by removing material in an edge region which is to be welded in order to reduce the edge region to a thickness approximately equal to that of the thinner of the two sheet metal blanks, and thereafter the reduced thickness edge region of the thicker of the two sheet metal blanks and the edge region of the thinner of the two sheet metal blanks are placed in overlapping relationship with the thinner of the sheet metal blanks overlapping less than all of the reduced thickness edge region of the thicker of the two sheet metal blanks, and then the overlapping sheet metal blanks are mash seam welded to form a weld region between the blanks whereby the reduced thickness edge region of at least the thicker of the two sheet metal sheets is larger than the weld region.

2. The method as claimed in claim 1, characterized in that the removing of material in the edge region of the thicker sheet metal blank or of both sheet metal blanks, which is to be welded, is accomplished by machining.

3. Process as claimed in claim 2, characterized in that the edge regions of both sheet metal blanks which are to be welded are machined at an angle inclined to the metal sheet surface as preparation for the mash seam welding.

4. The method as claimed in claim 1, characterized in that the two sheet metal blanks are mash seam welded together along the edge regions to obtain a thickness (t3) of the mash seam at maximum 1.4 times the mean thickness $((t1+t2)/2)$ of the two edge regions together.

5. A method of seam welding sheet metal blanks of unequal thickness, characterized in that, as preparation for the welding operation in which edge regions of the sheet metal blanks are placed in an overlapping relationship with a joint plane between the edge regions, the thicker of the two sheet metal blanks is treated by removing material to reduce the thickness of the edge region which is to be welded to a thickness approximately equal to that of the thinner of the two sheet metal blanks, the edge region of the thinner of the two sheet metal blanks which is to be welded is treated on the surface facing the joint plane substantially without reduction of thickness, and thereafter the a limited portion of reduced thickness edge region of the thicker blank and the edge region of the thinner blank are placed in overlapping relationship and mash seam welded.

* * * * *